Nov. 19, 1940.  E. C. WHITE  2,221,887
MIRROR SIGN
Filed July 28, 1939
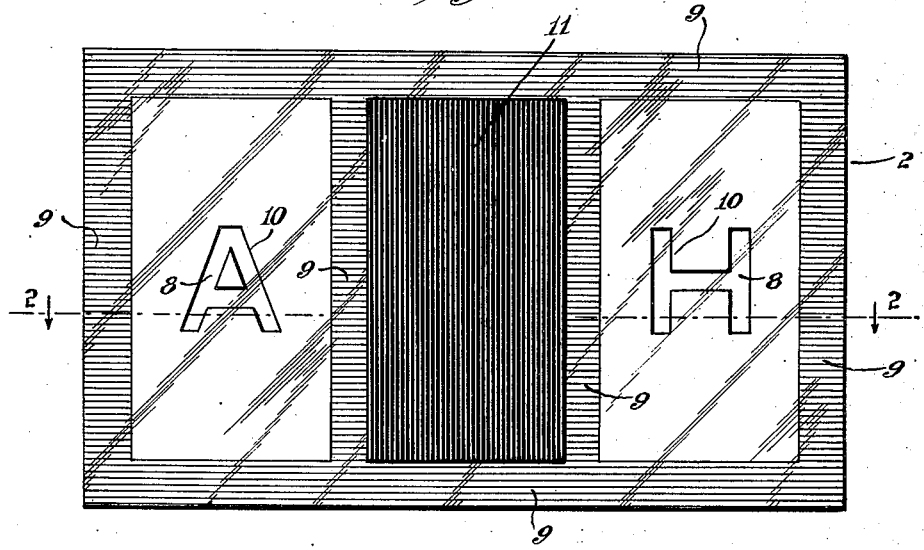
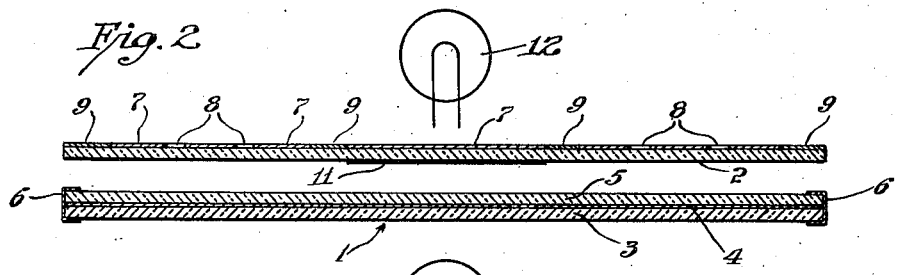
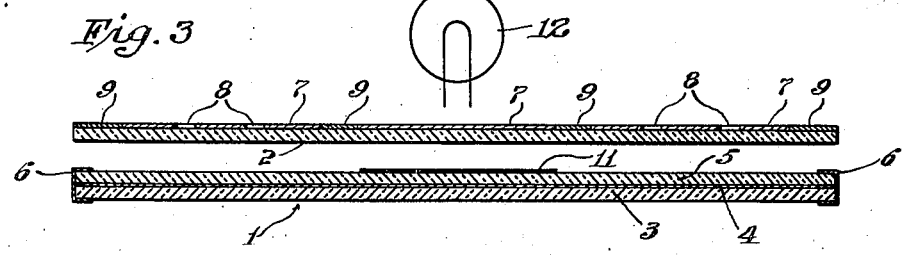
INVENTOR
Ernest Cantelo White
BY
ATTORNEY Patented Nov. 19, 1940

2,221,887

UNITED STATES PATENT OFFICE 2,221,887

MIRROR SIGN

Ernest Cantelo White, Bronxville, N. Y., assignor to Multi Vue Signs Company, Incorporated, New York, N. Y., a corporation of New York Application July 28, 1939, Serial No. 287,101

1 Claim. (Cl. 40—130)

The present invention relates to improvements in a mirror sign capable of producing multiple images.

There are two general types of signs of this character; one in which the images do not appear to move, as disclosed, for example, in U. S. Letters Patent 1,202,593, issued Oct. 24, 1916, to George McI. Scott, and the other in which the images appear to move, as exemplified in U. S. Letters Patent 2,132,472, issued Oct. 11, 1938, to Norman En Holm; and also as disclosed in my copending application, Serial No. 281,531, filed June 28, 1939.

Both types of signs embody a so-called "transparent mirror" and an opaque mirror, one or both of the mirrors being provided with indicia. The essential difference between the two kinds of signs is, in one the mirrors are not in motion, and in the other they are caused to assume varying relative angular positions because of a continuous relative motion between the mirrors or between the mirrors and the support therefor.

The mirrors are mounted in a casing and are illuminated by a light source enclosed thereby. When the sign is illuminated the indicia and multiple images thereof are rendered visible through the transparent mirror, and as long as the sign is illuminated the transparent mirror ceases to reflect, except to produce multiple reflections in cooperation with the rear or opaque mirror. Under these conditions the transparent mirror ceases to function as a useful mirror in the sense that objects in front thereof are not reflected efficiently during the time the sign is illuminated.

Another disadvantage of having the entire reflecting surface of the transparent mirror become functionally transparent when illuminated from behind is that it prevents the utilization of certain novel combinations and/or arrangements of indicia which might otherwise be employed if means were provided for obstructing the reflection of internal light through portions of the transparent mirror, thereby making such portions non-transparent, with the result that exceptionally novel advertising effects may be predicated thereon.

An object of the invention is to render a portion of the transparent mirror, embodied in a sign of the class described, apparently non-transparent when the sign is illuminated, so that the transparent mirror will always have an effective portion of its surface apparently opaque whether or not the sign is illuminated.

Another object is to provide the combination with a non-transparent surface, of a transparent mirror forming part of a mirror system capable of producing multiple reflections by the cooperative effect of the mirrors comprising the system.

A special object of the invention is the embodiment of a permanently useful mirrored surface as part of a transparent mirror included in a mirror system adapted to produce multiple images.

Other novel details of construction and arrangement of parts which are exemplified in the accompanying drawing and manifested from the following description are additional objects of the invention.

Broadly, my invention contemplates the interception of transmitted light through a portion of a transparent mirror included in a mirror system capable of producing multiple images, it being immaterial whether or not the sign is of the animated or inanimate type. However, in the present application the invention will be illustrated and described as embodied in a sign of the inanimate type.

In practicing the invention, I interpose between the front surface of the opaque mirror and the rear surface of the transparent mirror a non-reflecting surface, which latter surface may be independent of either of the mirrors, or it may be formed upon the rear surface of the transparent mirror, or upon the front surface of the opaque mirror. Whether the mirrors are separated or are in contact with each other is immaterial. It is also immaterial whether the source of illumination for the mirrors is in the rear of the opaque mirror or whether it is arranged between the mirrors. Comparatively speaking, the only thing that is material is that the non-reflecting surface be interposed with respect to the transparent mirror and the opaque mirror.

Exteriorly of the non-transparent portions formed or developed upon the transparent mirror by the interposed non-reflecting surface, indicia may be applied in any approved manner, so as to be multiply reflected by the cooperative effects of the transparent mirror and the rear opaque mirror. To accentuate or perhaps give greater prominence to certain of the indicia, I may provide a translucent border or decoration designed to frame or to outline the confines of the indicia visible through the transparent mirror. By suitable arrangement of border, a paneling effect may become apparent on the transparent mirror when the sign is illuminated.

Referring to the accompanying drawing:

Fig. 1 is a front elevation of a transparent mirror showing transparent and apparently non-transparent sections surrounded by an apparent border, said mirror comprising part of a mirror system of a sign embodying the invention;

Fig. 2 is a cross section of the mirrors comprising the mirror system and having a non-transparent material applied to the front surface of the opaque mirror; and Fig. 3 is a similar view showing the non-transparent material applied to the rear surface of the cover glass for the transparent mirror.

Referring to the accompanying drawing, there is illustrated the arrangement and treatment of the mirrors comprising the mirror system. It will be understood that a casing for the mirrors may be of conventional construction such as shown in the aforesaid Scott Patent 1,202,593. A special form of housing and lighting is disclosed in my companion application filed concurrently herewith and bearing Serial Number 287,103, and an oscillating mechanism for the rear mirror, so as to produce apparently movable images, is somewhat schematically represented therein.

It will be seen that the mirror system of a sign of the class herein contemplated includes a front transparent mirror 1 and a rear opaque mirror 2. As is well known in the art, a transparent mirror comprises a sheet of glass 3 having a thin coating 4 of silver on its rear face which coating is sufficiently thin to pass transmitted light but capable of forming a reflecting surface by reflected light. The opaque mirror is provided with a thick silvered coating 7 on its rear face which is non-transparent to transmitted light. To protect the silver coating on the transparent mirror, it is covered with a sheet of clear glass 5, the glass and mirror being bound together, around their marginal edges, with thin adhesive tape 6, thus uniting the same into a unitary element. The opaque mirror 2 may be treated in any desired manner to produce indicia visible when illuminated. One well known method of providing the mirror 2 with indicia of this character is by the so-called "silk screen" process, which is employed to remove portions of the silver coating 7 and to apply a transparent or translucent color to the removed or cut-out portions 8. As this feature is no part of the present invention, further description thereof is deemed unnecessary. By the same process, on the marginal edges, the coating 7 may be removed and a translucent colored border 9 may be applied.

To effect a non-transparent area on the transparent mirror 1, I provide an opaque, non-reflecting surface 11, either on the front face of the opaque mirror 2 (see Fig. 2) or on the rear face of the cover glass 5 (see Fig. 3). The surface 11 being opaque and non-reflecting, definitely defines a corresponding area on the transparent mirror 1 which is apparently non-transparent, i. e., when the sign is illuminated that portion of the transparent mirror 1 receives no reflected light from the surface 11 and therefore remains a reflecting surface for external light. It will therefore be seen that in that respect the transparent mirror 1 has a portion of its surface which is always capable of functioning as an apparently opaque mirror, irrespective of whether or not the sign is illuminated. It will also be observed that because of this feature there will be a portion of the mirror 1 upon which no indicia will appear. The border 9 defines side panels in which appear the indicia 10, formed in the cut-out portions 8, and the center panel constitutes the apparently opaque mirror on which, or through which, no indicia are visible.

In Fig. 1, the apparent non-transparent portion of the transparent mirror 1, is illustrated by heavy shading to distinguish it from the transparent portions, but it will be understood that in reality as far as the outward appearance of the mirror 1 is concerned, especially when the sign is not illuminated, the entire surface of the mirror 1 is free of any indicia, and the whole mirror is reflective of objects in front thereof. It is only when the illuminating means is in use that the paneling effect and the indicia become apparent; however, the portion of the mirror comprising the center panel does not appear transparent because of the non-transparent coating.

From the foregoing it will be appreciated that the present invention is characterized by the features of effecting an apparently opaque portion on the transparent mirror through the interception of internal illumination, thus providing a permanently useful mirror. By developing this non-transparent portion on the transparent mirror, the indicia formed on the rear opaque mirror are only visible in the unobstructed portions of the transparent mirror, thereby segregating the indicia to localized portions of the sign, which portions may be further emphasized by treatment such as producing a paneling effect, or forming any other desired decorations.

Although my invention may be reduced to the simplicity of elements and arrangement thereof, changes may be made by those skilled in the art without departing from the spirit thereof. For instance, the opaque non-reflecting surface may be interposed between the transparent mirror and the opaque mirror in any manner and still accomplish its function. For example, it may comprise an entirely independent element interposed between the mirrors 1 and 2. It is my desire to cover all such changes and modifications as come within the appended claim.

What is claimed is:

In a sign of the class described having a casing, a front transparent mirror and an opaque rear mirror supported in said casing, said mirrors having opposed and spaced reflecting surfaces, a light source enclosed within the casing, a display element positioned to be illuminated from said light source and multireflected by said reflecting surfaces, and means for obstructing the reflection of light from said source through a portion of said transparent mirror, said means including a non-reflecting surface part interposed between and spaced apart from the reflecting surface of said opaque mirror and the reflecting surface of said transparent mirror, whereby an apparently non-transparent area defined by said non-reflecting surface part is effected upon said transparent mirror.

ERNEST CANTELO WHITE.